Patented Oct. 20, 1942

2,299,274

UNITED STATES PATENT OFFICE 2,299,274

PRODUCTION OF AMINOTRIAZINES

William H. Hill, Stamford, Conn., assignor to American Cyanamid Company, New York, N. Y., a corporation of Maine No Drawing. Original application August 18, 1938, Serial No. 225,564. Divided and this application November 1, 1939, Serial No. 302,321

8 Claims. (Cl. 260—248)

This invention relates to aminotriazine mixtures obtained by the heat treatment of dicyandiamide, and to resinous materials obtainable by condensing these products with aldehydes such as formaldehyde. The invention relates more particularly to the heat conversion of dicyandiamide in the presence of a liquid medium which will operate simultaneously as a solvent, a heat transfer medium and an automatic temperature regulating medium for preventing undue rises in temperature by reason of the heat of the reaction or through other causes, and to the products obtained thereby.

In my copending application Serial No. 225,564, filed August 18, 1938, I have described a method of producing a thermodecomposition product of dicyandiamide which can be reacted with formaldehyde to give new and valuable compositions. The present invention is directed to this thermodecomposition product itself, and the present application is a division of my earlier application above identified.

I have now discovered that I may prepare a new type of product by heating dicyandiamide suspended or dissolved in a suitable medium free from formaldehyde, to a temperature and for a time sufficient to liberate substantial amounts of ammonia. Analysis of the products obtained by this method shows that they consist largely of a mixture of aminotriazines. The principal constituents of the mixture are melamine and melamine deamination products such as melam and melem together with some unconverted dicyandiamide. However the exact composition of the mixture is difficult to determine and, in fact, may vary within fairly wide limits depending upon the time and temperature of heating and the amount of ammonia evolved.

My new dicyandiamide thermodecomposition products may be reacted with formaldehyde to give new and valuable compositions. These reactions and the methods of carrying out the same will be described in greater detail below although it is to be understood that the invention is not restricted to the particular examples given.

Example 1

One method which I may utilize for decomposing the dicyandiamide is by heating it in boiling naphthalene (218° C.) with constant stirring. The naphthalene is first brought to the boiling point and then the dicyandiamide is added slowly enough so that the temperature of the naphthalene does not drop below the melting point of the dicyandiamide (208° C.). The dicyandiamide will decompose exothermically and tend to keep the temperature of the naphthalene at its boiling point. The heat of reaction is preferably removed by the naphthalene in a reflux condenser heated with steam. Copious quantities of ammonia will issue from the condenser during the decomposition and can be collected in acid or some other suitable medium. If the exothermic heat at any time is insufficient, the reaction vessel can be satisfactorily heated by an oil bath at about 250° C. The reaction should be complete after about 30 minutes when the evolution of ammonia gas substantially ceases. The thermodecomposition product is a solid at the boiling temperature of the naphthalene.

This material can be ground up, after pouring off the naphthalene, and used directly for preparing resins or it can be extracted several times with benzene or some other suitable naphthalene solvent which is a non-solvent for the product and dried. The naphthalene can also be removed by placing the powdered product in an oven with a stream of hot air passing over it.

This pulverized decomposition product is practically pure white and a 10% water mixture has a pH of 8.0. I may take 120 parts by weight of this product and dissolve it in 150 parts by weight of neutral or alkaline 40% formaldehyde if refluxed a short time.

The reaction product of the thermodecomposition material with formaldehyde is thermo-setting and may be utilized for the various purposes for which such materials are adapted as, for instance, in the preparation of adhesives, laminated materials, textile treating materials, castings, and for the production of molding materials.

Example 2

I mix 504 parts by weight of dicyandiamide with 564 parts by weight of 39.5° phenol. This mixture is heated under reflux for from 2 to 6½ hours. Boiling commences at the reflux temperature of phenol, about 181° C., and during the heating the temperature rises to about 191° C., during which time ammonia is given off to the extent of about 0.141 to 0.197 moles of ammonia per mole of dicyandiamide. During the beginning of the heating, the dicyandiamide dissolves in the phenol to give a clear solution, but upon continued heating a solid material separates from the liquid which, upon cooling, also solidifies.

The phenol may be separated from the thermodecomposition product of the dicyandiamide or the mixture may be allowed to remain and the mixed product reacted with formaldehyde as follows:

To 520 parts by weight of 37.5% formaldehyde solution, I add 7.5 parts N/2 sodium hydroxide which gives a solution having a pH of about 9.1. I add to this formaldehyde solution 385 parts by weight of the phenol-dicyandiamide refluxed product, and heat to boiling under reflux for one hour at a temperature of about 96° C. At the end of this period the pH of the solution is about 7.3 to 7.6 and the solution contains about 2.2% free formaldehyde. The formaldehyde reaction product is preferably dehydrated at 15–20 inches vacuum for a period of about 1 to 2 hours until about 381 parts by weight of water are removed, the final temperature being about 100–110° C. Upon cooling, the material solidifies to a solid resin which is preferably ground to 150 mesh.

I may prepare a molding composition by mixing 200 parts by weight of the ground resin with 20 parts by weight of hexamethylene tetramine, 2 parts by weight of calcium stearate and 200 parts by weight of wood flour. This mixture is ground in a ball mill until a homogeneous product is obtained. I then prefer to roll the mixture between rolls heated to 105° C. for a period of about 45 seconds to 1 minute and 15 seconds. The rolled mixture is then reground, and after screening may be molded in a suitable pressure mold at a temperature of 165° C. with a 1 to 3 minute cure.

The moldings obtained by utilization of these condensation products are characterized by their strength, relatively light color, high water resistance and other outstanding properties.

In place of the naphthalene or phenol, I may use as my heating materials other hydrocarbons and other phenolic compounds, such ammonium salts as ammonium thiocyanate and such substances as aniline, quinoline, and the like.

What I claim is:

1. A method of preparing an aminotriazine mixture suitable for condensation with an aldehyde for resin production which comprises heating dicyandiamide at atmospheric pressures, in a stable, non-reactive formaldehyde-free medium which is liquid at about 150° C., to a temperature and for a time sufficient to liberate substantial amounts of ammonia less than 0.2 moles per mole of dicyandiamide.

2. A method of preparing an aminotriazine mixture suitable for condensation with an aldehyde for resin production which comprises heating dicyandiamide at atmospheric pressures in a formaldehyde-free medium which is liquid at about 150° C. and which boils at about 181–218° C. at atmospheric pressures at about the boiling temperature of the liquid and for a time sufficient to liberate ammonia to the extent of about 0.14 to 0.2 moles of ammonia per mole of dicyandiamide.

3. A method of preparing an aminotriazine mixture suitable for condensation with an aldehyde for resin production which comprises heating dicyandiamide at atmospheric pressures in a formaldehyde-free phenol at about the boiling point of the phenol for a time sufficient to liberate substantial amounts of ammonia.

4. A method of preparing an aminotriazine mixture suitable for condensation with an aldehyde for resin production which comprises heating dicyandiamide at atmospheric pressures in a formaldehyde-free phenol at about the boiling point of the phenol for a time sufficient to liberate ammonia to the extent of about 0.14 to 0.2 moles of ammonia per mole of dicyandiamide.

5. A formaldehyde-reactive aminotriazine mixture comprising the product obtained upon heating dicyandiamide at substantially atmospheric pressures in a stable, non-reactive, formaldehyde-free medium which is liquid at about 150° C. to a temperature and for a time sufficient to liberate substantial amounts of ammonia less than 0.2 moles per mole of dicyandiamide.

6. A formaldehyde-reactive aminotriazine mixture comprising the product obtained upon heating dicyandiamide at substantially atmospheric pressures in a formaldehyde-free medium which is liquid at about 150° C. and which boils at about 181–218° C. at atmospheric pressures at about the boiling temperature of the liquid and for a time sufficient to liberate ammonia to the extent of about 0.14 to 0.2 moles of ammonia per mole of dicyandiamide.

7. A formaldehyde-reactive aminotriazine mixture comprising the product obtained upon heating dicyandiamide at atmospheric pressures in a formaldehyde-free phenol at about the boiling point of the phenol for a time sufficient to liberate substantial amounts of ammonia.

8. A formaldehyde-reactive aminotriazine mixture comprising the product obtained upon heating dicyandiamide at atmospheric pressures in a formaldehyde-free phenol at about the boiling point of the phenol for a time sufficient to liberate ammonia to the extent of about 0.14 to 0.2 moles of ammonia per mole of dicyandiamide.

WILLIAM H. HILL.